July 9, 1957　　　　　W. A. ERNST　　　　　2,798,979
MOTORIZED DRINK MIXERS
Filed Aug. 11, 1954　　　　　　　　　　　　2 Sheets-Sheet 1
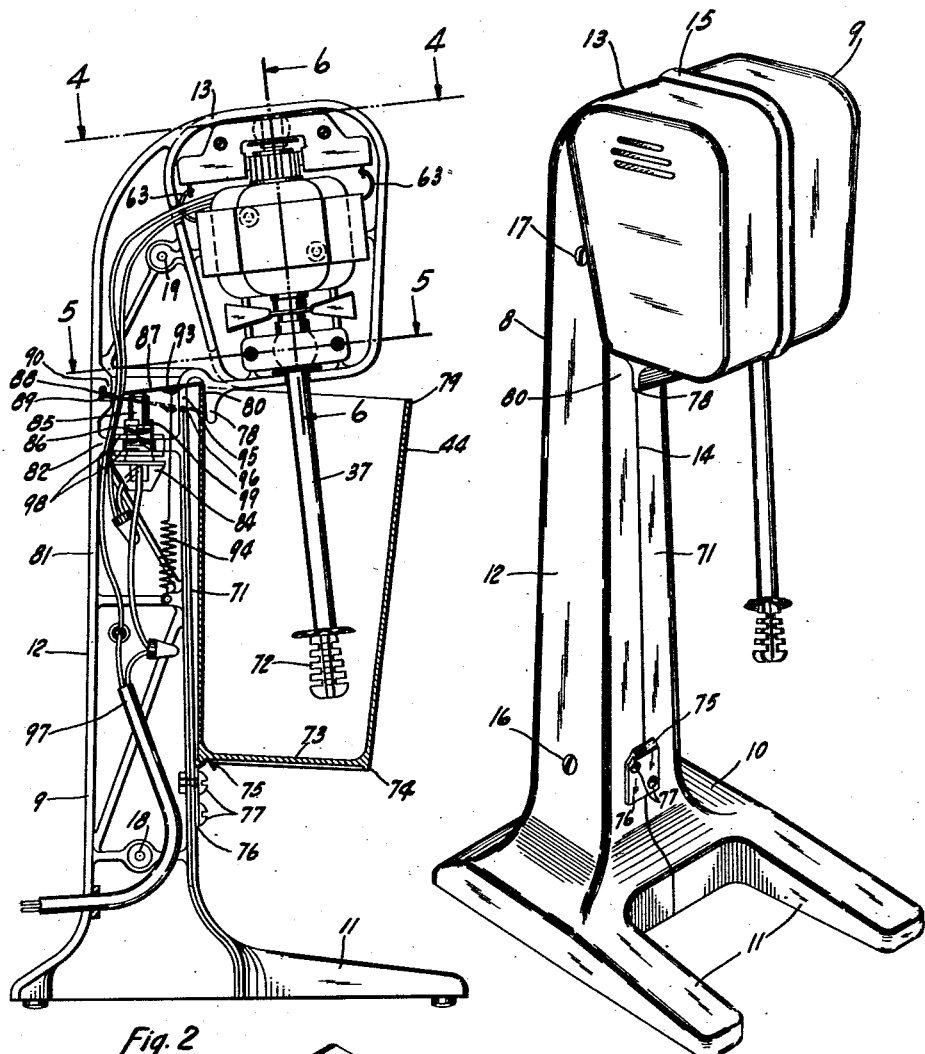
Fig. 2
Fig. 1
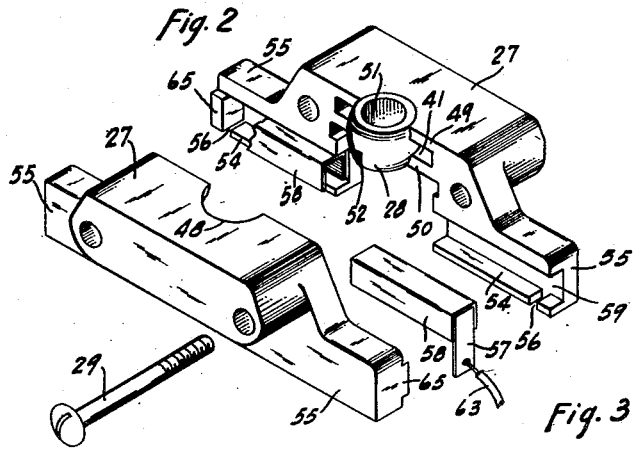
Fig. 3
INVENTOR.
W. ARTHUR ERNST
BY
Wheeler, Wheeler + Wheeler
ATTORNEY July 9, 1957 W. A. ERNST 2,798,979
MOTORIZED DRINK MIXERS
Filed Aug. 11, 1954 2 Sheets-Sheet 2

INVENTOR.
W. ARTHUR ERNST
BY
Wheeler, Wheeler & Wheeler
ATTORNEYS

United States Patent Office 2,798,979
Patented July 9, 1957

2,798,979
MOTORIZED DRINK MIXERS

W. Arthur Ernst, Racine, Wis.

Application August 11, 1954, Serial No. 449,109

10 Claims. (Cl. 310—258)

This invention relates to improvements in motorized drink mixers of the type shown in my prior United States patents, No. 2,564,887 issued August 21, 1951, and No. 2,654,847 issued October 6, 1953.

The present invention relates to improvements chiefly effecting substantial savings in cost of fabrication. In prior art drink mixers the electric motor which powers the mixer agitator is conventionally of the enclosed type in that it is provided with a motor casing which is in turn enclosed by the casing of the mixer head. In the device of the present invention, however, I have completely eliminated the motor casing by mounting the separate motor components directly on the head casing and in proper alignment for motor operation. Thus the mixer head serves as the only motor casing needed. By thus eliminating the motor casing I reduce the cost of the mixer, improve circulation of cooling air about the component parts of the motor and improve accessibility of the motor parts for maintenance and repair. All separate parts of the motor are desirably mounted on one half-section of the casing to be instantly accessible on removal of the other half-section of the casing which serves as a removable closure.

Another feature of the invention resides in my novel provision for a unitary armature bearing block and commutator brush holder. This structure provides rigid support for the armature and brushes notwithstanding lack of a motor casing. The block is fastened directly to the mixer head.

Further savings in fabrication costs are effected by eliminating costly and relatively complex switch actuating means of the type disclosed in my prior patents aforesaid. In the device of the present invention these are replaced with an extremely simple switch actuator which may be fabricated at a fraction of the cost of prior devices. In this connection, prior art switch actuators conventionally include means for holding the top rim of the container cup. As the prior art actuators thus constitute part of the cup mounting they must be provided with relatively stable sliding supports to hold the cup against the dislocating pressures generated by the agitator. In my simplified actuator I have eliminated its cup retaining function and have substituted therefor a cup retainer formed integrally with the mixer housing. Thus the switch actuator of my invention is not subject to undue strain and its mounting may accordingly be much simpler and less costly than those of the prior art.

Other objects and advantages of the invention will be more apparent to one skilled in the art upon examination of the following disclosure.

In the drawings:

Fig. 1 is a perspective view of a mixer embodying my invention.

Fig. 2 is a vertical cross section taken through the housing of the mixer of Fig. 1, the motor and agitator being shown in elevation.

Fig. 3 is a perspective view in spaced apart relationship of the various component parts of my combined bearing block and commutator brush holder.

Figure 4:
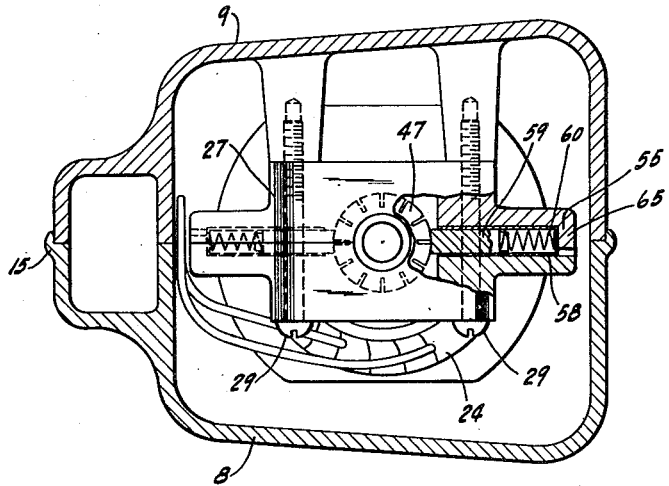
Fig. 4 is a cross sectional view taken along the line 4—4 of Fig. 2, a portion of the combined bearing block and commutator brush holder being broken away to expose details of construction.
Figure 5:
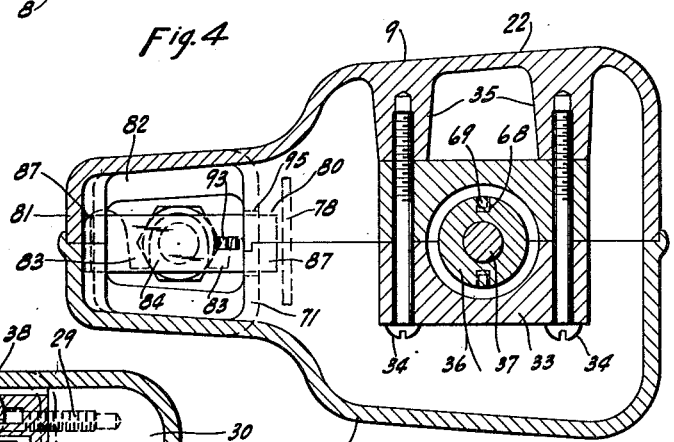
Fig. 5 is a cross sectional view taken along the line 5—5 of Fig. 2.

The mixer housing is made up of vertically mating half-sections 8 and 9 which together comprise a base or stand 10 having forwardly directed stabilizing legs 11, one on each half-section, and an upright columnar support 12 for the mixer head 13. The line on which the respective half-sections mate is indicated by reference character 14. A bead 15 may be provided on half-section 8 to cover parting line 14 in the head portion 13 of the device. The respective half-sections of the casing are connected by means of the screws 16, 17 which are threaded into suitable bosses 18, 19 (see Fig. 2) in half-section 9.

Figure 6:
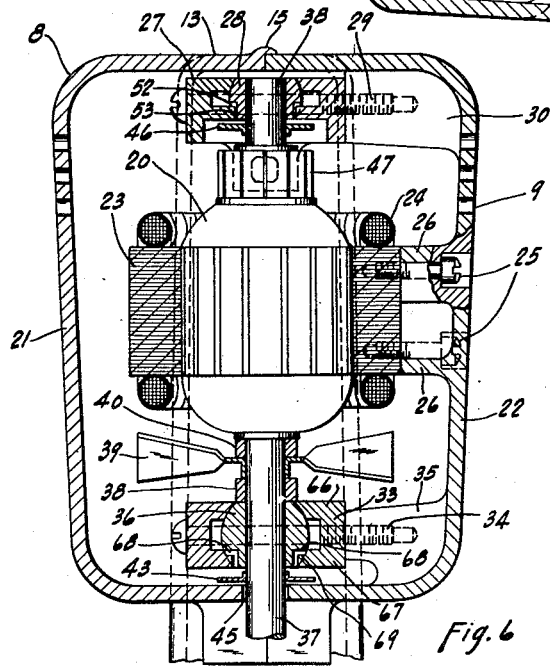
Fig. 6 is a cross sectional view taken along the line 6—6 of Fig. 2.

As best shown in Figs. 2 and 6, all the component parts of the mixer motor are mounted on side wall 22 of half-section 9 in the head portion 13 of the mixer. Wall 21 of half-section 8 functions as a removable closure for the head. When half-section 8 is removed all parts of the motor remain mounted on wall 22 and are exposed for repair and maintenance.

The laminated core 23 of the motor field coil 24 is provided with tapped holes to receive mounting screws 25 which clamp the core 23 against the internal bosses 26 formed on the wall 22. The bosses 26 are externally socketed to countersink the screw heads. Screws 25 are manipulated from a position outside the casing.

Armature 20 is mounted axially within core 23 by means of upper and lower bearings also mounted entirely upon wall 22. The upper armature bearing comprises a bushing 28 mounted between the complementary mating half-sections 27 of my combined bearing block and commutator brush holder. Screws 29 mount the bushing sections 27 in assembly to bosses 30 formed internally on wall 22.

The lower bearing comprises bearing bushing 36 mounted between the complementary mating half-sections 33 of lower bearing block which is held in assembly by screws 34 to suitable bosses 35 formed internally on wall 22. Both bearing bushings 28, 36 are cylindrically bored and mounted in their respective bearing blocks 27, 33 in axial alignment with the oppositely extending shafts 37 and 38 of armature 20.

Armature shaft 37 is provided with a thrust bearing 38, fan blades 39 and spacer 40 whereby the armature 20 is supported on bearing 36 with its coils within the field of coil 24. Disk slinger 43 may be provided on shaft 37 below bearing 36 to prevent oil from leaking from the bushing down shaft 37 into the container cup 44. Mixer head 13 is provided with a bottom opening 45 axially aligned with the armature to provide for passage of the shaft 37. Upper armature shaft 38 may also be provided with a disk slinger 46 to prevent oil from leaking down shaft 38 into the commutator 47.

As best shown in Figs. 3 and 4, the half-sections 27 of the upper bearing block are substantially identical and may be cast of plastic or the like from the same mold. The body of the block is desirably slotted at 41 to define upper and lower webs 49 and 50 which are provided with mating semi-circular marginal notches 48. The bushings 28, 36 each desirably comprise a midsection of a sphere having cylindrical bores 51 to receive the respective armature shafts 37, 38. The spherical periphery of bushing 28 mates with the spherically beveled marigns of webs 49, 50. Bushing 28 may be notched out at 52 at diametrically opposite sides of the bushing for interlocking engagement with corresponding lugs 53 (Fig. 6) extending from corresponding edges of web 50. Thus the bushing is locked against rotation.

Bushing 36 is similarly fabricated with notches 68 engaged with lugs 69 on spaced webs 66, 67 which constitute the body of lower bearing half-sections 33.

Bearing block half-sections 27 are also provided with depending wings 55 channeled at 59 and having a bottom flange 54 slotted at 56 to receive the downwardly extending connector lugs 57 of metal brush sleeves 58. Sleeves 58 are seated within mating channels 59 and house the commutator brushes 59 (Fig. 4) which engage under pressure of compression springs 60 against the segments of commutator 47.

The lugs 57 on brush holders 58 are connected by means of the conductor 63 with the field coils 24. As best shown in Figs. 3 and 4, the ends of the channel wing members 55 are substantially closed by tongues 65 formed at opposite ends of members 55. The tongues seat almost completely across the otherwise open end of the channels 59.

The bearing block half-sections 27 and channel shaped members 55 are unitarily molded of plastic or other synthetic or natural material of high dielectric and mechanical strength. Accordingly, notwithstanding the absence of a motor casing, the commutator brushes and shaft bearings for the armature are rigidly supported in a structure which is readily accessible and easily disassembled with respect to its supporting wall 22.

To replace brushes 59, etc. the removable closure wall 21 is opened laterally, thus exposing all parts of the motor mounted on wall 22. Screws 29 may then be removed and the half-sections 27 of the bearing block parted. Removal of the screws 34 from engagement with bottom bearing block 33 and screws 25 from engagement with field core 23 permits removal of all motor parts from the head 13 and complete disassembly of the motor.

The end of armature shaft 37 is provided with an agitator 72 which is disposed near the bottom of container cup 44 for mixing the contents thereof. The cup 44 is conventionally provided with a bottom wall 73 having a peripheral flange 74 which may be engaged over the lip 75 of bracket ledge 76 secured by screws 77 to the stand column 12.

Fabricated integrally with the head 13 is a retainer or ridge 78 which is spaced with respect to the front wall 71 of column 12 to provide between the wall and ridge a way or channel 80 within which the top rim 79 of the container cup is confined when its bottom flange 74 is engaged over lip 75. In the preferred embodiment of the invention I mold the half-sections 8 and 9 of the mixer stand, column and head of synthetic plastic. Retainer ridge 78 is conveniently formed in the same mold with the head.

As best shown in Figs. 2 and 3, half-section 9 is provided in column 12 with a laterally extending bracket 82 having yoke arms 83 which provide a semi-circular seat for motor switch 84. Switch 84 is of the type illustrated in detail in my prior Patent 2,564,887 aforesaid. It is securely positioned on yoke arms 83 by means of opposed nuts 98 threaded to switch body 99. It includes a projecting actuator button 85 biased by internal spring 86 toward projected position in which the switch is closed. Button 85 is normally held open against the bias of spring 86 by actuator arm 87 which comprises a flat plate having a rear edge flange 88. Flange 88 is seated in a pocket 89 formed in the rear wall 81 of stand 12. The mouth of pocket 89 is defined by wall flange 90 which extends in the opposite direction from plate flange 88 and is interlocked therewith.

Intermediate its length arm 87 is provided with a swaged anchor 93 for tension spring 94 which has a greater bias than spring 86. Accordingly, the tension of spring 94 is adequate to hold the switch button 85 depressed against its spring 86 and hold switch 84 in normally open position.

The front wall 71 of column 12 is also provided with a slot 95 through which the forward end of arm 87 normally projects into channel 80. From its normal position resting against edge 96 of the slot 95 in wall 71 arm 87 is forced upwardly against the bias of spring 94 under pressure of the top rim 79 of the container cup when the cup is lifted into channel 80 to engage its flange 74 with bracket lip 75. Release of button 85 from the pressure of arm 87 permits spring 86 to raise button 85 and close switch 84. Switch 84 is in series with the electrical wiring enclosed in sheath 97 and which connects the mixer motor to a source of electrical energy.

By provision for the flanged pocket 89 in the rear wall 81 of the column 12 and the interlocking engagement thereof with actuator arm 87, I have been able to completely eliminate the relatively more complex switch arm actuators shown in my prior patents aforesaid.

By reason of the aforedescribed features the cost of the mixer has been substantially reduced, without sacrificing strength, durability or efficiency.

I claim:

1. A motor driven drink mixer comprising an electric motor housing having a wall upon which the component parts of said motor are individually mounted in alignment, said motor comprising a field core having means for mounting it on said wall, a rotatable armature in said core and having axially extending aligned shaft members, end bearings having means mounting them on said wall in alignment with said armature shafts whereby to support said armature in said field core and independently of said core, said means comprising separable bearing block portions having mating end bearing seat cavities, and means releasably clamping said portions together, said housing having a removable side wall providing access to said motor parts directly upon removal thereof, said walls comprising means for enclosing said motor.

2. The device of claim 1 in which said armature shaft is provided with a commutator, one of said end bearings being disposed at the end of said shaft beyond said commutator, one of said bearing blocks being integrally provided with a holder for a commutator brush whereby the brush holder and bearing block are unitarily mounted on said wall and are unitarily removable from said casing.

3. The device of claim 2 in which said one bearing block comprises mating internally channeled members, the walls of the members about said channels comprises seats for brush holders.

4. The device of claim 3 in which said brush holders comprise metal liners mounted in said channels and providing electrical conduit means to said brushes.

5. A combined bearing block and brush holder for a motor of the character described and having a commutator mounted on the motor armature shaft at a point spaced from the end thereof, said combined bearing block and brush holder having bushing means aligned with said armature shaft to rotatably support said armature, said block having integrally formed opposed ways laterally aligned with the armature shaft commutator, and brushes mounted in said ways.

6. The device of claim 5 in which said ways comprise mating channel shaped members, said brushes being provided with metallic sleeves mounted in the mating channels of said members to provide an electrical conduit to said brushes, said bushing means comprising a mid-section of a sphere and having a spherical wall for which said bearing block is provided with a spherical seat, said bushing being provided with a cylindrical bore for said armature shaft.

7. The device of claim 6 in which the spherical seat of said bushing block comprises axially spaced walls engaging said bushing at opposite sides of a plane through the major axis of said sphere, said walls being spaced to provide an internal chamber therebetween and about the mid-section of the bushing.

8. In a motor driven mixer having a columnar stand and a mixer motor supported on the stand, a motor control switch having an actuating button, said stand having a mounting bracket for said switch, a first wall at one side of the switch, said first wall being provided with a pocket partially closed by a wall flange, an arm extending across said switch actuating button, said arm having an end flange seated in said first wall pocket and engaged with said first wall flange whereby to retain said arm impositively in said pocket for pivotal movement about the first wall flange as a fulcrum.

9. The device of claim 8 in which said stand has a second wall with a slot through which said arm extends to receive motion from a mixer cup, and spring means biasing said arm flange into engagement with the first wall pocket flange.

10. A combined bearing block and brush holder member for a motor having an armature shaft and a commutator spaced from the end of the shaft, said member comprising several parts mating on a plane through the axis of the shaft, the respective parts having axially spaced laterally aligned sets of cavities, a shaft bushing in one set of cavities and a commutator brush assembly in another set of cavities, and means releasably clamping said parts together to hold said bushing and brush assembly in operative relation to the armature shaft and commutator.

References Cited in the file of this patent

UNITED STATES PATENTS

| | | |
|---|---|---|
| 1,711,396 | Ruetz | Apr. 30, 1929 |
| 2,065,440 | Flaum | Dec. 22, 1936 |
| 2,469,932 | Ritter | May 10, 1949 |
| 2,479,455 | Aronoff | Aug. 16, 1949 |
| 2,498,570 | Myers | Feb. 21, 1950 |
| 2,615,942 | Edman | Oct. 28, 1952 |

FOREIGN PATENTS

| | | |
|---|---|---|
| 137,422 | Australia | Jan. 27, 1949 |